United States Patent [19]

Paret et al.

[11] Patent Number: 5,226,952
[45] Date of Patent: Jul. 13, 1993

[54] NITRIDE PROCESS FOR REFINING CALCIUM

[75] Inventors: Alain Paret, La Roche de Rame; Francois Peyron, Paris, both of France

[73] Assignee: Pechiney Electrometallurgie, Courbevoie, France

[21] Appl. No.: 883,958

[22] Filed: May 15, 1992

[30] Foreign Application Priority Data

May 17, 1991 [FR] France ............................ 91 06613

[51] Int. Cl.$^5$ ............................................. C22B 26/20
[52] U.S. Cl. ...................................... 75/605; 423/412
[58] Field of Search ................ 75/605, 607, 608, 609, 75/10.29; 420/415; 423/412

[56] References Cited

U.S. PATENT DOCUMENTS

| | | |
|---|---|---|
| 2,893,862 | 7/1959 | Walaschewski et al. ............ 75/608 |
| 4,582,532 | 4/1986 | Christini et al. . |
| 4,765,831 | 8/1988 | Cochran et al. . |
| 4,769,067 | 9/1988 | Cochran et al. . |
| 4,812,168 | 3/1989 | Cochran et al. . |

FOREIGN PATENT DOCUMENTS

| | | |
|---|---|---|
| 371771 | 6/1990 | European Pat. Off. . |
| 602062 | 5/1948 | United Kingdom . |
| 803062 | 9/1956 | United Kingdom . |

*Primary Examiner*—Melvyn J. Andrews
*Attorney, Agent, or Firm*—Dennison, Meserole, Pollack & Scheiner

[57] ABSTRACT

A process for refining calcium containing aluminum as an impurity in the form $CaAl_2$. The calcium is nitrided to form $Ca_3N_2$, and that $Ca_3N_2$ is made to react with $CaAl_2$ initially present and with the particulate aluminum in such a manner as to form calcium, which is isolatable in the form of high-purity calcium containing less than 0.1% by weight of aluminum, and aluminum nitride.

23 Claims, No Drawings

NITRIDE PROCESS FOR REFINING CALCIUM

FIELD OF THE INVENTION

The invention relates to a process for refining calcium making it possible to obtain high-purity calcium, in particular with a low aluminum content.

BACKGROUND OF THE INVENTION

It is known that the production of calcium is done especially by aluminothermic treatment of lime at about 1400° C. in the solid phase, by the following reaction:

$$5CaO + 2Al \rightarrow Al_2O_3, 2CaO + 3Ca$$

The reaction is carried out in an oven in a vacuum. The calcium is separated in the vapor state and condensed to a solid.

However, aluminum vapor is entrained in such a way that this process leads to a calcium that contains a not insignificant quantity of aluminum, on the order of from one to several percent, in the form of $CaAl_2$.

The production of calcium by electrolysis of a calcium salt is also known. This process produces a calcium with a low content of impurities, in particular aluminum, but it is not economically profitable compared with the previous process.

Finally, it has also been proposed that calcium be produced by the following reaction:

$$CaSi + Fe \rightarrow FeSi + Ca$$

This reaction, which may be done in the solid phase with divided products, or in the liquid phase after melting of the starting products, does produce a calcium of adequate purity, but is no longer competitive economically compared with the first method discussed above, that is, aluminothermic treatment of lime.

OBJECT OF THE INVENTION

Although a calcium containing small quantities of aluminum, such as 1 to 3% (in percentage by weight) can be used for certain usages, such as deoxidizing steel, there are also applications that require a calcium of high purity, particularly with a low content of aluminum, particularly less than 0.1% by weight.

Among these applications can be mentioned the production of certain metals by calciothermics, for example the production of uranium by calciothermic treatment of $UO_2$.

The use of calcium for producing certain alloys can also be mentioned, examples being alloys of lead used to make batteries For all these applications, it is indispensable that a calcium with less than 0.1% aluminum be used.

It is admittedly technically possible to obtain a calcium with less 0.1% aluminum by distilling calcium obtained from aluminothermic treatment of lime, but such a process is not economically viable, because such distillation greatly increases the cost price, in any case too far past what the market is prepared to pay for a calcium of greater purity.

The present applicant has accordingly sought a process for obtaining a calcium with less than 0.1% aluminum at a competitive price and in such a manner as to meet all of these applications.

SUMMARY OF THE INVENTION

According to the invention, the process for refining a calcium containing more than 0.1% by weight of aluminum, in the form of $CaAl_2$, in an oven is characterized in that the calcium introduced into the oven is nitrided to form $Ca_3N_2$, and that $Ca_3N_2$ is made to react with $CaAl_2$ initially present in the calcium to be refined, and with the particulate aluminum, in such a manner as to form insoluble calcium, in the form of high-purity calcium containing less than 0.1% by weight of aluminum, and an aluminum nitride (AlN), which constitutes a valuable raw material The concept on which the present invention is based consists in realizing two operations simultaneously:
  purification of the calcium; and
  the production of AlN, which is a valuable material for producing refractory materials.

Thus, instead of focusing on the direct elimination of the aluminum, which would have been expensive as already noted, the present applicant has contrarily sought to introduce it into the process according to the invention, which makes it possible to realize two operations simultaneously, which benefit one another.

However, to implement such an idea, it was necessary to solve a certain number of problems, in order to have complete, selective reactions and to obtain reaction products (Ca and AlN) that are both easily isolatable and have the desired purity.

These reactions, which take place with at least one solid phase, are as follows:
  The reaction of formation of calcium nitride $$3Ca + N_2 \rightarrow Ca_3N_2 \quad (1)$$

Reactions of the calcium nitride with the aluminum and with $CaAl_2$ (impurity of the starting calcium):

$$Ca_3N_2 + 2Al \rightarrow 2AlN + 3Ca \quad (2)$$

$$Ca_3N_2 + CaAl_2 \rightarrow AlN + 4Ca \quad (3)$$

The present applicant has found that it was advantageous to introduce the aluminum at the beginning of the process and initially to make a homogeneously distributed mixture of two granular solids, that is, the calcium to be refined and the aluminum, to avert having an overly heterogeneous reaction medium and incomplete chemical reactions.

As a nitriding agent, the applicant has selected nitrogen, and the nitriding reaction was carried out at a temperature of between 200° and 350° C., and preferably between 220° and 300° C.

One essential problem that the applicant had to solve was to control the reaction of the four chemical species (Ca, Al, $N_2$, $CaAl_2$) present at the time of the nitriding of the calcium.

In effect, it is possible for the following two reactions to take place at the same time:

$$3Ca + N_2 \rightarrow Ca_3N_2 \quad (1)$$

$$Ca + Al_2 \rightarrow CaAl_2 \quad (4)$$

According to the invention it is important that only reaction (1) take place, because it is only the formation of $Ca_3N_2$ that makes it possible to obtain the final AlN.

Admittedly, the process according to the invention could tolerate the reaction of a small quantity of aluminum with the calcium by reaction (4), but the presence of concurrent reactions signifies poor control of the stoichiometry of the reagents, and generally the consequence is the presence of undesirable continuents at the end of the reaction. It is essential for the process to have rigorous stoichiometry, so that only Ca and AlN are obtained at the end of the reaction, without the inhibiting presence of Al, $Ca_3N_2$ or $CaAl_2$.

According to the invention, reaction (4) of the aluminum with the calcium at the time of the nitriding of the calcium is avoided by using the particulate aluminum, with a mean particle size >1 mm, and by nitriding the calcium at a temperature lower than 350° C. The applicant has in fact observed that the "parasitic reaction" (4) occurs more easily when the aluminum was in finer, divided form, and in that case this reaction (4) took place at a temperature greater than 350° C.

In addition, the aluminum powder should not be too coarse, so as to limit the heterogeneity of the reaction medium. Thus a mean particle size of between 1 and 5 mm is necessary, and preferably a mean particle size between 2 and 3 mm.

The invention is preferably employed by proceeding as follows:

a) After the aluminum content of the calcium to be purified has been determined by quantitative analysis, the calcium to be refined, in particles containing n mols of calcium and m mols of $CaAl_2$, is mixed with at most $(n-3m) \cdot \frac{2}{3}$ mols of aluminum, in particles having a mean particle size of between 2 and 3 mm.

b) This mixture of powders is compressed so as to form pellets.

c) After these pellets have been placed in an oven, generally using a basket, $Ca_3N_2$ is formed by nitriding the calcium of these pellets and keeping them at a nitrogen pressure and at a temperature of between 220° and 300° C., by regulating the supply of nitrogen, which makes it possible to control the temperature.

d) The oven is placed under a vacuum, and it is brought to a temperature of between 700° and 1200° C., in such a manner as to form AlN and Ca, by the reaction of $Ca_3N_2$ with the $CaAl_2$ initially present and with the aluminum initially introduced, and the calcium (n+m mols) purified to less than 0.1% aluminum is collected by distillation, and in the oven, the AlN (2n/3 mols) that is usable as raw materials for refractory materials is collected.

It is important that the quantity of aluminum to be introduced be adjusted precisely, as a function of the composition of the calcium to be purified: for n mols of calcium containing m mols of $CaAl_2$, a number of mols of aluminum equal to $\frac{2}{3} \cdot (n-3m)$ must be introduced.

If there were excess aluminum, then it would be inhibiting at the time of distillation of the calcium and could repollute it.

It is important according to the invention that the particles of calcium to be purified and those of aluminum be compressed in such a way that the pellets have sufficient mechanical strength for the entire duration of the process and in fact remain in the solid, agglomerated state despite the variation in chemical nature of the solid phase over the duration of the process ($Ca \rightarrow Ca_3N_2 \rightarrow AlN$).

However, it is also important that the nitrogen be capable of diffusing easily to inside the pellets, so as to nitride the calcium, and also that the calcium formed at high temperature can be separated from the AlN by distillation. For all these reasons, it is unnecessary for the pellets to be overly strongly agglomerated. In practice, it suffices that the pellets have an open porosity of between 5 and 15% by volume of the pellet, which can generally be obtained with pressures typically ranging between 0.5 and 2 metric tons/cm$^2$ (or in other words approximately 50 MPa and 200 MPa).

The invention makes it possible to purify even calcium that is heavily laden with aluminum. However, it is unnecessary for the molar ratio of Ca to Al in the calcium to be purified to be less than 2. In fact, for this limit value, the mixture to be purified is composed of $3Ca+CaAl_2$, which after nitriding leads to $Ca_3N_2+CaAl_2$, and such a mixture, by a complete reaction (3), leads to $2AlN+4Ca$, without the additional introduction of particulate aluminum.

According to the invention, Ca and AlN are formed by reactions (2) and (3) above the melting temperature of the calcium and in a vacuum, in such a way that the calcium formed can be distilled continuously, and that essentially a solid phase in the oven prevails, in the form of solid, porous pellets, which at the end of the operation are pellets of AlN that are easy to remove from the oven and manipulate.

These pellets of AlN may still contain small quantities of calcium, which is little hindrance to the later use of the AlN. However, the residual content of calcium decreases strongly when the temperature at which the reactions (2) and (3) of formation of the calcium is raised, as examples 1 and 2 illustrate.

According to the invention, it is possible to control the nitriding by regulating the pressure and quantity of nitrogen consumed in the oven. It is accordingly possible to nitride a predetermined quantity or fraction of the calcium to be purified.

This capability is profited from in particular to achieve one embodiment of the invention that is important especially when the starting calcium is rich in $CaAl_2$. In this embodiment, the process according to the invention is used, without introducing aluminum, solely to purify the calcium and convert the $CaAl_2$ into Ca and AlN.

To do so, as many mols of $Ca_3N_2$ as there are moles of $CaAl_2$ in the calcium to be purified are formed, by controlled and limited nitriding of the calcium, so that only the reaction (3) will take place.

Naturally, if the initial calcium content in the form of $CaAl_2$ is low, typically on the order of 1 to 3%, then while it is possible according to the invention to implement this embodiment, nevertheless in that case it loses its economic advantage.

The process according to the invention may also be employed for the purification of other metals of group II of the periodic table.

With a view to reclaiming the magnesium contained in partially oxidized magnesium fines, then for the purification of the calcium the procedure is by the following steps:

formation of pellets of a mixture of magnesium fines and aluminum scrap (particle size of the scrap greater than 1.2 mm in this case), selective nitriding of the magnesium at about 200° C. to form $Mg_2N_2$ (the reaction of the aluminum and magnesium is avoided $12Al+17Mg \rightarrow Al_{12}Mg_{17}$)

the reaction of $Mg_2N_2$ with Al at 900° C., to form Mg reclaimed by the distillation and AlN.

The residue from the process, principally constituting AlN and impurities, essentially MgO and $Mg_3N_2$, may be converted, after addition of alumina and introduction of the mixture into electrosmelted magnesia, into a solid solution of AlN in MgO (double oxynitride of magnesium and aluminum), which constitutes a valuable material.

EXAMPLES

Example 1

82 kg of impure calcium, quantitatively analyzed with 2.4% aluminum by weight, was ground so as to obtain particles having a particle size less than 5 mm. The fraction with a particle size of less than 2 mm represented 4% by weight of the ground batch.

This particulate calcium was mixed with 20 kg of aluminum in the form of particles approximately 2 mm in size.

This mixture of particles, carefully homogenized, was compressed into pellets of approximately 50 g, cylindrical pellets 4 cm in diameter and 15 mm in length, obtained by cold compression of the particle mixture, by exerting a pressure on the order of 1 metric ton/cm$^2$(approximately 100 Mpa).

These pellets were put into an iron basket that was placed in an oven constituted by a sealed, externally heated envelope.

After vacuum degassing of the oven, it was put under nitrogen pressure (one atmosphere), and then the temperature was raised progressively.

A strong exothermic reaction began at 250° C. To avoid an overly strong rise in temperature, which would promote the formation of $CaAl_2$, the nitrogen rate was modulated so as to control the nitriding of the calcium and prevent the temperature of the batch from exceeding 350° C.

After stabilization and stoppage of the nitrogen consumption, the oven was put in a vacuum, and the temperature was raised progressively to 900° C.

The calcium vapor formed on a water-cooled condenser, disposed in the top of the oven, was collected.

At the end of the operation, after cooling, the oven was opened, and an ingot of 78 kg of calcium with less than 0.06% by weight of aluminum was recovered from the condenser, and 35 kg of AlN containing 5.7% by weight of calcium was collected from the basket.

Example 2

An operation identical to that described in Example 1 was performed, except that the batch was heated to 1150° C., rather than 900° C. in Example 1, after nitriding of the starting calcium.

The residual calcium content in the AlN reclaimed is then 0.72% by weight.

Example 3 (outside the scope of the invention)

10 kg of crude calcium with 1.7% aluminum by weight, in particles having a particle size less than 5 mm, were ground. These 10 kg of calcium particles were mixed with 1 kg of aluminum in the form of particles having a particle size between 0.5 and 1 mm.

The mixture of particles was compressed into pellets, and the process was continued as in Example 1.

At the time of the nitriding in a nitrogen atmosphere, it was observed that the quantity of nitrogen consumed was very low, and that it was necessary to heat the batch to 400° C. to observe the first exothermic reaction.

At 900° C., it was not possible to distill the batch correctly.

At the end of the operation, a molten Al-Ca alloy was reclaimed in the oven, with practically no deposit of calcium on the condenser.

Example 4

This example illustrates the reclamation of pure magnesium according to the invention from magnesium fines to be purified.

96 kg of magnesium fines, with a particle size of less 250 μm and quantitatively analyzed to contain 92.5% magnesium (hence 89 kg) and 7.5% MgO (hence 7 kg) were mixed with 54 kg of Al scrap in particles 2 mm in size, and then this mixture was pelleted.

After these pellets were loaded into an oven, the oven was placed in a nitrogen atmosphere, and the temperature was brought to 200° C. The nitrogen supply was regulated to control the temperature of the batch so that it would not exceed 250° C. 34 kg of $N_2$: were thus consumed. After the oven was placed in a vacuum, the temperature of the oven was raised to 900° C., and the magnesium formed in the oven was collected on the condenser. The distillation of the magnesium followed, by increasing the temperature of the water in the condenser. A 73 kg ingot of magnesium, quantitatively analyzed as containing 99.92% magnesium, was obtained on the condenser. In the oven, 111 kg of residues were obtained with the following quantitative analysis (in percent by weight):

74% AlN
20% $Mg_3N_2$
6% MgO

To this residue, 22 kg of powdered aluminum were added in such a manner as to adhere to the stoichiometry of the following reaction:

$$Mg_3N_2 + Al_2O_3 \rightarrow 2AlN + 3MgO$$

133 kg of a mixture were thus obtained, which were reduced to powder and added to 367 kg of magnesia, electrosmelted in an arc furnace.

After pouring, 500 g of electrosmelted double oxynitride of magnesium and aluminum was obtained, containing the equivalent in weight of 80% MgO and 20% AlN. This is an oxynitride where the species AlN and MgO do not exist as such in the pure state, but rather in the form of a solid solution of oxynitrides, having different properties from those of MgO and AlN. The balance sheet of materials in the test sample is accordingly as follows:

| starting materials: | |
|---|---|
| impure magnesium fines: | 96 kg |
| nitrogen: | 34 kg |
| aluminum: | 54 kg |
| alumina: | 22 kg |
| magnesia: | 367 kg |
| products obtained: | |
| pure magnesium: | 73 kg |
| oxynitride of Mg and Al: | 500 kg |

ADVANTAGES OF THE PROCESS

As already mentioned, the process according to the invention has a major importance economically, since it makes it possible simultaneously to obtain two products of high economic value, that is, calcium purified to less than 0.1% aluminum, and aluminum nitride in the case of the purification of calcium, or pure magnesium and a double oxynitride of magnesium and aluminum in the case of the reclamation of magnesium fines.

The ease of employment of this process should also be mentioned; it uses conventional equipment which require the handling of only solids, and which in fact proceeds entirely without the intermediate liquid phases (molten Al and Ca) appearing as such, as if all the reactions had taken place solely between gas and solid or solid and solid.

This is of great importance in practice, since with this process, the batch to be treated is in the form of solid pellets disposed in baskets, and consequently the manipulations and handling are easy, and above all pollution of the oven, with all that involves in terms of costs for cleaning and maintenance, cannot occur.

What is claimed is:

1. A process for refining, in an oven, of a calcium compound containing more than 0.1% aluminum by weight, in the form of $CaAl_2$, comprising the steps of introducing the calcium into an oven and nitriding the calcium compound to form $Ca_3N_2$, reacting the $Ca_3N_2$ with $CaAl_2$ initially present in the calcium to be refined and with particulate aluminum to form calcium, and recovering high-purity calcium containing less than 0.1% aluminum by weight, and an aluminum nitride (AlN), which constitutes a valuable raw material.

2. The process of claim 1, in which said particulate aluminum is introduced into the oven before the calcium is nitrided.

3. The process of claim 2, in which a mixture of homogeneous distribution of particles of Ca and Al, compressed into the form of pellets, is introduced into the oven.

4. The process of one of claims 1-3, in which said particles of Al have a particle size of between 1 and 5 mm.

5. The process of claim 4, in which said particles of Al preferably have a particle size of between 2 and 3 mm.

6. The process of claim 3, in which said pellets have an open porosity of between 5 and 15% of the volume of the pellets 7. The process of any one of claims 1-3, in which the calcium is nitrided with the aid of nitrogen at a temperature of between 200° and 350° C.

8. The process of claim 7, in which the temperature of the calcium nitriding reaction is controlled by regulating the supply of nitrogen.

9. The process of one of claims 1-3, in which the calcium nitride formed is made to react with the particulate aluminum introduced and with $CaAl_2$ initially present in the calcium, at a temperature of between 700° and 1200° C., and the calcium formed is separated by distillation.

10. The process of one of claims 1-3, in which the molar ratio Ca/Al of the calcium to be purified is equal to at least 2.

11. The process of one of claims 1-3, in which a calcium to be purified, containing n mols of calcium and m moles of $CaAl_2$, is nitrided in such a manner as to form n/3 mols of $Ca_3N_2$, which is made to react with m mols of $CaAl_2$ and $(n-3m)\cdot\frac{2}{3}$mols of aluminum, so that aside from losses, n+m mols of purified calcium and 2n/3 mols of AlN are obtained.

12. A process for refining, in an oven, of a calcium compound containing more than 0.1% aluminum by weight, in the form of $CaAl_2$, comprising the steps of introducing a limited quantity of the calcium into the oven and nitriding the calcium compound with nitrogen at a temperature of between 200° and 350° C., to form as many mols of $Ca_3N_2$ as there are mols of $CaAl_2$ initially present in the calcium compound to be refined, reacting the $Ca_3N_2$ formed with $CaAl_2$ initially present in the calcium to be refined, at a temperature of between 700° and 1200° C., to form purified calcium, and isolating the purified calcium by distillation in the form of high-purity calcium containing less than 0.1% by weight of aluminum, and aluminum nitride (AlN), which constitutes a valuable raw material.

13. The process of claim 4, in which said pellets have an open porosity of between 5 and 15% of the volume of the pellets.

14. The process of claim 5, in which said pellets have an open porosity of between 5 and 15% of the volume of the pellets.

15. The process of claim 4, in which the calcium is nitrided with the aid of nitrogen at a temperature of between 200° and 350° C.

16. The process of claim 5, in which the calcium is nitrided with the aid of nitrogen at a temperature of between 200° and 350° C.

17. The process Of claim 6, in which the calcium is nitrided with the aid of nitrogen at a temperature of between 200° and 350° C.

18. The process of claim 4, in which the calcium nitride formed is made to react with the particulate aluminum introduced and with $CaAl_2$ initially present in the calcium, at a temperature of between 700° and 1200° C., and the calcium formed is separated by distillation.

19. The process of claim 5, in which the calcium nitride formed is made to react with the particulate aluminum introduced and with $CaAl_2$ initially present in the calcium, at a temperature of between 700° and 1200° C., and the calcium formed is separated by distillation.

20. The process of claim 4, in which the molar ratio Ca/Al of the calcium to be purified is equal to at least 2.

21. The process of claim 5, in which the molar ratio Ca/Al of the calcium to be purified is equal to at least 2.

22. The process of claim 4, in which a calcium to be purified, containing n mols of calcium and m moles of $CaAl_2$, is nitrided in such a manner as to form n/3 mols of $Ca_3N_2$, which is made to react with m mols of $CaAl_2$ and $(n-3m)\cdot\frac{2}{3}$mols of aluminum, so that aside from losses, n+m mols of purified calcium and 2n/3 mols of AlN are obtained.

23. The process of claim 5, in which a calcium to be purified, containing n mols of calcium and m moles of $CaAl_2$, is nitrided in such a manner as to form n/3 mols of $Ca_3N_2$, which is made to react with m mols of $CaAl_2$ and $(n-3m)\cdot\frac{2}{3}$mols of aluminum, so that aside from losses, n+m mols of purified calcium and 2n/3 mols of AlN are obtained.

* * * * *